United States Patent
Orth

(10) Patent No.: US 6,547,905 B1
(45) Date of Patent: Apr. 15, 2003

(54) FABRIC COVERED SUPPORT

(75) Inventor: Arno Orth, Hamm (DE)

(73) Assignee: Seeber Systemtechnik KG, Worms (DE)

( * ) Notice: Subject to any disclaimer, the term of this patent is extended or adjusted under 35 U.S.C. 154(b) by 247 days.

(21) Appl. No.: 09/705,932

(22) Filed: Nov. 6, 2000

(30) Foreign Application Priority Data

Nov. 4, 1999 (DE) .......................................... 199 53 111

(51) Int. Cl.⁷ ............................................. B32B 31/26
(52) U.S. Cl. .......................................... 156/82; 156/196
(58) Field of Search ........................ 156/82, 196, 199, 156/229, 242, 308.2, 324

(56) References Cited

U.S. PATENT DOCUMENTS

| | | | | |
|---|---|---|---|---|
| 4,545,105 A | * | 10/1985 | Kowalsky | ................. 29/469.5 |
| 5,562,873 A | * | 10/1996 | Tornero | ...................... 264/161 |
| 5,972,259 A | * | 10/1999 | Hettinga | .................... 264/45.5 |

FOREIGN PATENT DOCUMENTS

| | | |
|---|---|---|
| DE | 37 22 873 | 4/1989 |
| DE | 41 17 709 | 8/1992 |
| DE | 41 16 040 | 11/1992 |
| EP | 0 064 756 | 11/1982 |

OTHER PUBLICATIONS

"Flammkaschiermaschine zum Verbinden von Polyurethanschaumstoff–Folien mit Traegerbahnen," Kunststoffe Bd. 54, 1964, Heft 7, pp. 470–471.

* cited by examiner

Primary Examiner—James Sells
(74) Attorney, Agent, or Firm—Foley & Lardner

(57) ABSTRACT

A fabric covering support such as that for interior trim of motor vehicles, includes a support which is adapted in shape to the area to be covered with trim and is provided with a foam backing, and has a fabric covering arranged on the visible side of the foam. The support is a nonwoven material made with a thermoplastic binder, and both the support and the fabric with the foam backing are bonded by flame lamination.

5 Claims, 1 Drawing Sheet

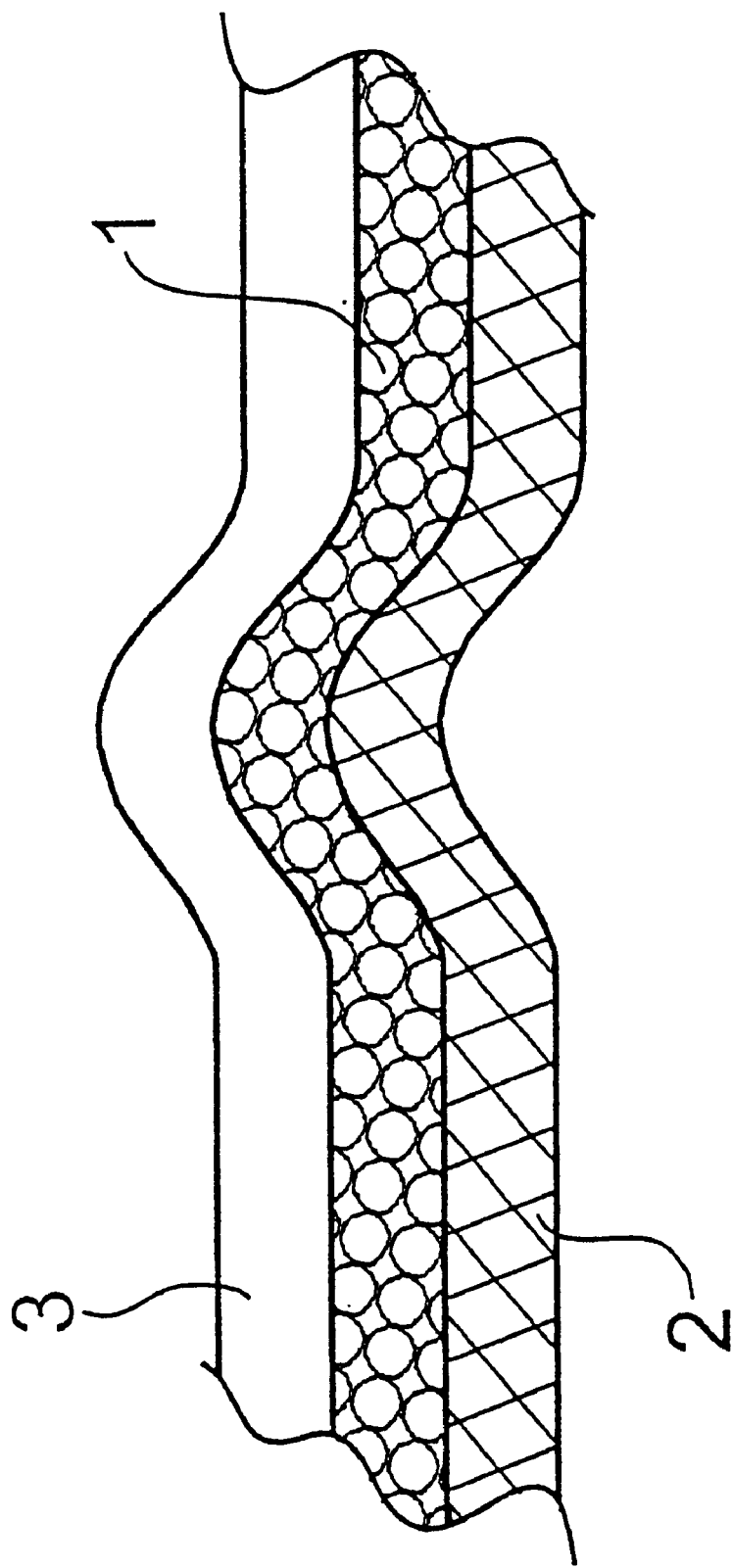

FABRIC COVERED SUPPORT

BACKGROUND OF THE INVENTION

1. Field of the Invention

The present invention relates to a fabric covered support and to a process for its production.

2. Brief Description of the Related Art

Conventional fabric covered supports comprise a support to which a foam backing of a decorative fabric is adhesively bonded. The support itself in this case comprises natural fibers and epoxy resin, is initially produced in the desired contours and three-dimensional form and is adhesively bonded to the fabric bearing the foam backing. Such fabric covering supports serve in particular for the interior trim of motor vehicles, for example on the doors.

One disadvantage of such fabric covering supports is a relatively high weight, caused by the natural fiber composite with the epoxy resin. Furthermore, the conventional material can splinter at relatively low temperatures and the epoxy resin is not odorless. The products are relatively costly and, finally, they may delaminate when there are changes in climatic conditions. The conventional production process also has the disadvantages that separate extrusion or injection molding of the support is required, that the production is complex and the fabric tends to crease during production.

German Patent Application Publication DE 37 22 873 A1 discloses a process in which a solid, dimensionally stable support of sheet metal or a fibrous nonwoven containing polypropylene with a foam and a decorative layer are bonded to one another. This takes place by initially providing the foam with a decorative layer, for example, by flame lamination, then bringing the support to the melting temperature of the foam and pressing the parts together, with the foam beginning to melt. The heat required for the process of melting the surface of the intermediate layer originates exclusively from the previously heated support.

One disadvantage is that the melting operation excessively melts the foam, so that its properties deteriorate, because the heat content of the support cannot be controlled in such a way that the foam melts only superficially in a very thin layer, as in the case of flame lamination. Moreover, the pressing operation causes the excessively melted foam to penetrate not only into the support (if a nonwoven is used), but also into the foam itself and increases its density. Subsequent three-dimensional forming of the pressed blank is not possible.

German Patent Application Publication DE 41 16 040 A1 also discloses a three-layered material for items of clothing, comprising a textile material layer, a foam layer and a nonwoven, which is to have good compatibility with the skin. It is also possible for the nonwoven to be a knitted material. The textile layer and foam layer are said to be bonded with the aid of a melting film. In this case, the dimensional stability is restricted, so that parts of interior trim cannot be produced in this way.

SUMMARY OF THE INVENTION

One object of the present invention is accordingly to produce fabric covered supports which are preferably of lower weight and which have, inter alia, increased resistance to climatic conditions, are dimensionally stable and do not tend to splinter. In addition, the flexible properties of the foam are not to be impaired by the production process.

These objects are achieved by a fabric covered support, in particular for the interior trim of motor vehicles, comprising a support which is adapted in shape to the area to be covered with trim and is provided with a foam backing, and comprising a fabric covering arranged on the visible side of the foam, wherein the support is a nonwoven material comprising a thermoplastic binder, and both the support and the fabric are bonded by flame lamination with the foam backing.

In accordance with another aspect of the invention, there is provided a process comprising: flame laminating and bonding a foam backing, a fabric covering and a supporting nonwoven material, wherein the supporting nonwoven material comprises fibers and/or filaments bonded with a thermoplastic binder, to form a composite; bringing the composite to a softening temperature of the binder; and pressing the composite in a cold die, thereby shaping the supporting nonwoven.

The following are the main advantages of such a solution. The finished part is up to 30% lighter, cannot splinter and is resistant to climatic conditions. In addition, it does not give off any odor.

It is also particularly advantageous that the fabric covered support according to the invention can be produced much more easily. In this process, the parts to be bonded to the foam backing are brought together in the form of webs, the foam backing is exposed to a flame in a known way, and the composite of the three components, the foam backing, supporting nonwoven and fabric covering, are passed through a roller nip, which presses the webs against one another and bonds them on both sides (preferably simultaneously) to the foam surfaces which have begun to melt. Thereafter, the fabric covering support to be produced is punched out.

Since the support nonwoven can be hot-formed, it is then sufficient, in order to carry out a three-dimensional shaping, to heat up the nonwoven material to its softening temperature, and use a cold pressing die for forming and cooling it. Since the fabric is already firmly bonded to the support part via the foam backing before the forming, there is also no risk of creasing during forming. Furthermore, shorter cycle times than the conventional times are ensured, since during forming/shaping the only other step is cooling.

The foam backing in this case advantageously comprises polyester- or polyether-based polyurethane, which is at one and the same time flexible and permanently elastic and has a pleasant feel. In principle, however, polyolefin foams or any other synthetic resin foam that is capable of flame laminating can also be used.

The supporting nonwoven material can comprise any nonwoven material made with a binder that is heat-softenable at a temperature that preferably does not exceed the melting temperature of the foam material employed (although exceeding the melting temperature of the foam is not harmful for the short periods of time employed in the process steps according to the invention, since most of the foam material does not reach its melting temperature).

Any type of fibers and/or filaments can be employed in the nonwoven material, including thermoplastic fibers, thermosetting fibers, natural fibers and even inorganic fibers. However, it is preferred to employ lighter weight fibers, most preferably synthetic resin fibers. In one preferred embodiment, the nonwoven material comprises, for example, a mixture of thermoplastic fibers with thermosetting fibers (polypropylene, polyester) and a suitable binder, such as butadiene styrene, for example. Moreover, this nonwoven material has the advantage of already being customary for certain applications in motor vehicle construction, for example, for non-load-bearing trim in the trunk interior.

The nonwoven material is preferably self-supporting or rigid, such that the laminated structure will retain its shape after being subjected to hot-forming and subsequent cooling in the cold mold. In this context, "cold" means a temperature below the melting point of the binder, and preferably not below room temperature. There is no criticality to the amount of pressure used in the forming step. It is sufficient to utilise enough pressure to form the laminate, while at the same time to prevent too high of a pressure that would unduly compress the materials of the laminate. A small amount of compression is acceptable.

BRIEF DESCRIPTION OF THE DRAWINGS

The various features and attendant advantages of the present invention will become more clearly appreciated from a detailed description is given with reference to the appended FIGURE which shows an exemplary embodiment.

DETAILED DESCRIPTION OF THE PREFERRED EMBODIMENTS

One preferred embodiment of the invention is depicted in the single FIGURE. As shown, the foam backing 1 has a support 2 and a fabric covering 3 bonded by flame lamination onto its opposite major surfaces or sides. The support 2, in this embodiment, comprises a nonwoven material with a fiber content of from 50 to 70% by weight and a binder content of from 30 to 50% by weight. The fibers comprise 0 to 20% by weight polypropylene and from 80 to 100% by weight polyester. The binder is butadiene styrene resin that can be softened at a temperature of about 140° C.

In this embodiment, the foam is a polyurethane foam, for example polyester-based RG 75, while the fabric is a customary decorative fabric. The support has a material thickness of approximately 3 mm, and the foam backing has a material thickness of approximately 6 mm.

The molding is initially produced as a planar web and, as indicated, is three-dimensionally shaped or configured according to requirements, by first being heated to a temperature at which the binder softens, and then by being shaped or formed in a cold press.

Although the present invention has been described with reference to only a relatively few embodiments, the concept and the various modifications and changes that can be made without departing from the scope thereof, limited only by the appended claims, will be self-evident to those skilled in the art to which it pertains.

The entire disclosure of the priority application, German Patent Application No. 199 53 111.0, filed Nov. 4, 1999, is hereby incorporated by reference into this application.

What is claimed is:

1. A process for producing a three-dimensionally formed fabric covered support, comprising:

flame laminating and bonding a foam backing, a fabric covering and a supporting nonwoven, the supporting nonwoven comprising a nonwoven material of fibers and/or filaments bonded with a thermoplastic binder, to form a composite;

bringing the composite to a temperature at which the binder softens; and pressing the composite in a cold die, thereby shaping the supporting nonwoven into a three-dimensional shape.

2. A process as claimed in claim 1, wherein the flame laminating comprises simultaneously laminating the foam backing, the fabric covering and the supporting nonwoven.

3. A process as claimed in claim 1, wherein the foam comprises a polyester- or polyether-based polyurethane.

4. A process as claimed in claim 1, wherein the binder comprises a copolymer of styrene and butadiene.

5. A process as claimed in claim 4, wherein the composite is heated to a temperature of approximately 140° C. before pressing in the cold die.

* * * * *